United States Patent
Yamanobe

(10) Patent No.: US 9,637,687 B2
(45) Date of Patent: May 2, 2017

(54) INFECTIOUS MEDICAL WASTE TREATMENT SYSTEM

(71) Applicant: Yoichiro Yamanobe, Iwaki (JP)

(72) Inventor: Yoichiro Yamanobe, Iwaki (JP)

( * ) Notice: Subject to any disclaimer, the term of this patent is extended or adjusted under 35 U.S.C. 154(b) by 546 days.

(21) Appl. No.: 14/091,611

(22) Filed: Nov. 27, 2013

(65) Prior Publication Data

US 2015/0147241 A1    May 28, 2015

(51) Int. Cl.
| | | |
|---|---|---|
| C10G 1/10 | (2006.01) | |
| B02C 18/00 | (2006.01) | |
| B01D 53/38 | (2006.01) | |
| B01D 53/75 | (2006.01) | |
| B09B 3/00 | (2006.01) | |
| B01D 53/00 | (2006.01) | |

(52) U.S. Cl.
CPC ............. *C10G 1/10* (2013.01); *B01D 53/38* (2013.01); *B01D 53/75* (2013.01); *B02C 18/0084* (2013.01); *B09B 3/0075* (2013.01); *B01D 53/002* (2013.01); *B01D 2257/20* (2013.01); *B01D 2257/30* (2013.01); *B01D 2257/40* (2013.01); *B01D 2257/90* (2013.01)

(58) Field of Classification Search
CPC ........ C10G 1/10; B09B 3/0075; B01D 53/75; B01D 53/38; B01D 53/40; A61L 2/04; F28F 19/00; F28F 19/008
See application file for complete search history.

(56) References Cited

U.S. PATENT DOCUMENTS

| | | | | |
|---|---|---|---|---|
| 6,588,690 B1 * | 7/2003 | Koenig | ........... | A61L 11/00 |
| | | | | 241/260.1 |
| 2007/0000768 A1 * | 1/2007 | Cauley | ........... | B09B 3/00 |
| | | | | 202/100 |

FOREIGN PATENT DOCUMENTS

| | | | | | |
|---|---|---|---|---|---|
| CH | WO 0102027 A1 * | 1/2001 | ........... | A61L 2/24 |
| GB | 375132 A * | 6/1932 | ........... | F28D 7/12 |
| JP | 09-279156 | 10/1997 | | |
| JP | 10-054627 | 2/1998 | | |
| JP | 11-152478 | 6/1999 | | |
| JP | 11-293259 | 10/1999 | | |
| JP | 2000-204192 | 7/2000 | | |
| JP | 2001-152163 | 6/2001 | | |
| JP | 2002-129169 | 5/2002 | | |
| JP | 2002-129170 | 5/2002 | | |
| JP | 2002-138287 | 5/2002 | | |
| JP | 3116906 U | 12/2005 | | |

* cited by examiner

*Primary Examiner* — Timothy Cleveland
(74) *Attorney, Agent, or Firm* — Harness, Dickey & Pierce, PLC

(57) ABSTRACT

An infectious medical waste treatment system includes system control means that electrically interlocks and integrally controls an infectious medical waste treatment apparatus, a cake cutting device, a cake shredding device, a flake conveying device, a flake temporary storage tank, a sealed-type flake supplying device, a heating, dry distilling and gasifying apparatus, a gas cooling and liquefying apparatus, an exhaust gas treatment apparatus, unburnt gas burner and an unburnt gas combustion apparatus.

17 Claims, 8 Drawing Sheets

COOLING WATER

INFECTIOUS MEDICAL WASTE TREATMENT SYSTEM

FIELD OF THE INVENTION

The present invention relates to an infectious medical waste sterilization, volume-reduction and detoxification/liquefaction system for subjecting infectious medical waste that becomes a social problem by being illegally dumped to sterilization, volume-reduction and detoxification treatment by a heating and compressing operation, and liquefying plastic components for energy recycle of the aforementioned treated waste.

DESCRIPTION OF RELATED ART

With respect to the present invention, the related art for subjecting infectious medical waste to sterilization, volume-reduction and detoxification treatment is as follows:

(1) Incineration treatment method for infectious medical waste,
(2) Shredding/chemical solution sterilization method for infectious medical waste,
(3) Autoclaving method for infectious medical waste,
(4) Microwave treatment method for infectious medical waste, and
(5) High-temperature plasma treatment method for infectious medical waste.

First, an incineration treatment method for infectious medical waste will be described.

The treatment method that incinerates infectious medical waste can be said to be an excellent method from the viewpoint of reliability of sterilization and a volume reducing effect. However, since when a chlorine resin contained in medical waste is burned, a large amount of hydrogen chloride gas is generated, an exhaust gas treatment apparatus is indispensable at the post stage of the incineration apparatus, not only equipment cost becomes enormous, but also a problem remains from the viewpoint of utilization of resources and energy because energy of the plastics that constitute most of medical waste cannot be utilized.

Next, a shredding/chemical solution sterilization method for infectious medical waste will be described.

The treatment method is a method that shreds raw infectious waste finely and subjecting the infectious waste to sterilization treatment by a chemical solution, and cannot be said to be a suitable treatment method, because when raw infectious waste is shredded, the pathogenic bacteria included in the infectious waste are scattered into the air to cause serious environmental contamination, after which, even when sterilization is performed with a chemical solution, the chemical solution does not spread over the shredded infectious waste, and not only complete sterilization treatment is impossible, but also the waste is scattered to forest and farms by strong winds if the waste is exposed on the ground surface in a waste disposal site, leading to a serious social problem.

Next, an autoclaving method for infectious medical waste will be described.

Since the treatment method is on the same principle as the method for cooking vegetables and meat with a pressure cooker, and the pressure at all sites in an autoclave is uniform, from "Pascal's principle," and therefore, the temperature should be uniform. However, in reality, the temperature is ununiform, and insufficient sterilization occurs. Therefore, there is a growing social awareness that an autoclaving method is unsuitable as an infectious medical waste treatment method, and autoclave facilities are gradually disposed of under present circumstances.

Next, a microwave treatment method for infectious medical waste will be described.

The method treats medical waste by using the principle of a microwave oven to carbonize the medical waste. However, the capability required to treat medical waste cannot be obtained, and an exhaust gas treatment apparatus is indispensable at the post stage of the system because when the chlorine resin included in the medical waste is treated, a large amount of hydrogen chloride gas is generated. Therefore, the manufacturers thereof withdrew from the market at once.

Furthermore, a high-temperature plasma treatment method for infectious medical waste will be described.

The treatment method treats medical waste with high-temperature plasma, and can be said to be an excellent method from the viewpoint of reliability of sterilization and volume reduction effect, but the method cannot help being said to be a method that goes against the global theme crying for energy saving, because not only increase in equipment cost is unavoidable since when the chlorine resin included in medical waste is treated, a large amount of hydrogen chloride gas is generated, and an exhaust gas treatment apparatus is indispensable at the post stage of the high-temperature plasma treatment apparatus, but also a large amount of electric energy is consumed.

In the present invention, the related arts for liquefying plastic components are as follows.

CITATION LIST

Patent Literature

[Patent Literature 1] JP-A-2002-138287
[Patent Literature 2] JP-A-2002-129170
[Patent Literature 3] JP-A-2002-129169
[Patent Literature 4] JP-A-2001-152163
[Patent Literature 5] JP-A-2000-204192
[Patent Literature 6] JP-A-11-293259
[Patent Literature 7] JP-A-11-152478
[Patent Literature 8] JP-A-10-54627
[Patent Literature 9] JP-A-9-279156
[Patent Literature 10] JP-U-3116906

While Patent literature 1 discloses a waste plastics thermal decomposition and liquefaction method and an apparatus of the same, the matters that are treated are in a slurry state or in a liquid state, and therefore, Patent Literature 1 has a disadvantage of having a restriction on forms of the raw material when used as a thermal decomposition and liquefaction apparatus for general plastic waste that includes blow or injection molded products, and the products in sheet and film shapes or in pellet shapes.

While Patent Literature 2 discloses a rotary kiln-type continuous plastics thermal decomposition apparatus, and has a feature of subjecting plastics to agitation/decomposition reaction with sand, Patent Literature 2 has disadvantages of requiring a recycle system for the sand since the sand is interposed, and occurrence of a short pass specific to a rotary kiln.

Patent Literature 3 disclose a vertical type of the above-described apparatus (Patent Literature 2), which has totally the same mode in subjecting plastics to agitation/decomposition reaction with sand, and has disadvantages of requiring a recycle system for the sand since the sand is interposed, and having a risk of the sand recycle system not functioning immediately when there is inclusion such as a metal piece, or a glass piece in plastics.

While Patent Literature 4, similarly to the above-described apparatus (Patent Literature 2), has a feature of using as the substitute of sand, silicon dioxide and aluminum oxide and porous soil as catalysts, Patent Literature 4 has disadvantages of requiring a recycle system for the catalysts, and providing no clear explanation of the contradicting problems of how plastics are charged and how the generated gas is sealed in the thermal decomposition step.

While Patent Literature 5 and Patent Literature 6 each have a feature of recovering halogen substances included in plastics as metallic salt, Patent Literatures 5 and 6 have disadvantages of having no specific statement about enhancement of productivity of the plastics liquefaction apparatuses and enhancement in environmental safety.

While Patent Literature 7 proposes the method for exciting the atoms forming plastics with energy of an electromagnetic field by generated electromagnetic waves to decompose/gasify the plastics, the method has a disadvantage of being extremely low in productivity and being difficult to upsize.

While Patent Literature 8 discloses the method for decomposing and liquefying plastic waste by a reaction with water in a supercritical region or in the vicinity of the supercritical region as a reaction medium, Patent Literature 8 has a disadvantage of the process having two stages because in the case of plastic waste including chlorine, the aforementioned reaction has to occur after the plastic waste is heated and decomposed to remove hydrogen chloride in advance.

Patent Literature 9 can be valued in that it proposes the most realistic and specific mode among the patent literatures cited so far, but has disadvantages that the raw material supplying device is of a screw feeder type and is unsuitable for supplying plastic waste in indeterminate forms, and that a specific mode for discharging residue such as a metal piece or a glass piece included in the plastic waste in the thermal decomposition apparatus is not described.

Patent Literature 10 provides only the means that makes a plastics liquefaction apparatus compact, and has a disadvantage of having no specific statement about enhancement of productivity of the plastics liquefaction apparatus and enhancement of environmental safety.

BRIEF SUMMARY OF THE INVENTION

Technical Problem

The problem to be solved by the present invention lies in reliably sterilizing, reducing in volume and detoxifying infectious medical waste, and heating and dry distilling the treated waste to liquefy the waste.

Since approximately 80% of infectious medical waste is plastic waste, an object of the present invention is to propose a reasonable process that obtains a fuel oil/light oil-corresponding product and a gasoline/naphtha-corresponding product by sterilizing, volume-reducing and detoxifying the plastic waste by a heating and compressing operation, conditioning the aforementioned treated waste into a flake form with a constant grain size by shredding the treated waste, gasifying the aforementioned flakes by a heating and dry distilling operation, and cooling and liquefying the aforementioned gas, and is integrated from sterilization, volume-reducing and detoxifying treatment for infectious medical waste to liquefaction treatment by the heating and dry distilling operation.

Solution to Problem

Means for solving the problem of the present invention will be described.

First, the means for solving the problem of the present invention is configured by
an infectious medical waste sterilizing and volume-reducing apparatus including heating and compressing means for sterilizing, reducing in volume and detoxifying plastic infectious medical waste by heating and compressing the infectious medical waste,
a cake cutting device including cutting means for cutting a treated cake that is obtained by sterilization, volume-reduction and detoxification by heating and compression in the infectious medical waste sterilizing and volume-reducing apparatus, into an arbitrary size,
a cake shredding device including shredding means for shredding the treated cake cut by the cake cutting device into a fixed grain size,
a flake conveying device including conveying means for conveying flakes obtained by shredding in the cake shredding device,
a flake temporary storage tank with a discharge mechanism for temporarily storing the flakes that are conveyed by the flake conveying device,
a sealed-type flake supplying device including sealed-type supplying means for supplying the flakes that are supplied from the flake temporary storage tank to a sealed vessel,
a heating, dry distilling and gasifying apparatus including heating and dry distilling means for heating and dry distilling the flakes that are supplied by the sealed-type flake supplying device to gasify the flakes,
a gas cooling and liquefying apparatus including gas cooling and liquefying means connected by piping to the heating, dry distilling and gasifying apparatus for cooling and liquefying gas that is generated in the heating, dry distilling and gasifying apparatus,
an exhaust gas treatment apparatus including removing means connected by piping to the gas cooling and liquefying apparatus for removing chloride/nitride/sulfide and the like included in residual gas that is not liquefied by the gas cooling and liquefying apparatus,
an unburnt gas combustion apparatus including combustion means connected by piping to the exhaust gas treatment apparatus for burning unburnt gas that is discharged from the exhaust gas treatment apparatus and removing odor, and
a system control device including system control means for electrically interlocking and integrally controlling the infectious medical waste treatment apparatus, the cake cutting device, the cake shredding device, the flake conveying device, the flake temporary storage tank, the sealed-type flake supplying device, the heating, dry distilling and gasifying apparatus, the gas cooling and liquefying apparatus, the exhaust gas treatment apparatus, a unburnt gas burner and the unburnt gas combustion apparatus.

Next, the means for solving the problem of the present invention is the infectious medical waste treatment system according to claim 1, wherein the infectious medical waste sterilizing and volume-reducing apparatus also includes cake cooling and solidifying means in the heating and compressing means to obtain a consolidated treated cake by cooling treated matter after the infectious medical waste is subjected to sterilizing, volume-reducing and detoxifying treatment by a heating and compressing operation, includes gas filtering means that filters out by an HEPA filter pathogenic bacteria included in generated gas in a step of heating and compressing the infectious medical waste in the heating and compressing means, further includes gas filtrating means that filters out odor included in the generated gas with an activated carbon filter, and can purify the generated gas.

Furthermore, the means for solving the problem of the present invention is the infectious medical waste treatment system according to claims 1 and 2, wherein the sealed-type flake supplying device is a vertical cylindrical pipe connecting the flake temporary storage tank and the heating, dry distilling and gasifying apparatus, with the vertical cylindrical pipe being provided with two flow path opening and closing means capable of opening and closing a flow path of the vertical cylindrical pipe, up and down, and can intermittently supply the flakes to the heating, dry distilling and gasifying apparatus while a sealed state of the heating, dry distilling and gasifying apparatus is kept by repeating an operation of initially opening upper-side opening and closing means of the flow path opening and closing means to actuate the exhaust mechanism of the flake temporary storage tank to supply the flakes for a fixed time period and stopping the discharge mechanism of the flake temporary storage tank, thereafter, closing the upper-side opening and closing means, subsequently opening a lower-side opening and closing means to cause the flakes to fall freely to the heating, dry distilling and gasifying apparatus, and thereafter closing the lower side opening and closing means.

Furthermore, the means for solving the problem of the present invention is the infectious medical waste treatment system according to claims 1 to 3, wherein the heating, dry distilling and gasifying apparatus includes a heating and dry distilling oven for heating and dry distilling the flakes to gasify the flakes, heating and dry distilling oven heating means including a heating furnace body opening and closing mechanism capable of opening and closing a part of a heating furnace body to heat the heating and dry distilling oven, agitating and mixing means for effectively heating the flakes in the heating and dry distilling oven by bringing the flakes into contact with an inner wall of the heating and dry distilling oven uniformly, and automatic residue discharging means for automatically discharging a residue in the heating and dry distilling oven by rotating the agitating and mixing means while tilting the heating and dry distilling oven and gradually opening an upper lid of the heating and dry distilling oven, and when the heating, dry distilling and gasifying apparatus heats, dry distills and gasifies the flakes continuously for a fixed time period, and thereafter, matters difficult to be gasified such as a metal piece/a glass piece/paper contained in the flakes accumulate as a residue in the heating and dry distilling oven, the heating and dry distilling oven heating means is stopped to open a part of a heating furnace with the heating furnace body opening and closing mechanism, the heating and dry distilling oven is tilted to open the upper lid of the heating and dry distilling oven gradually, at the same time, the residue in the heating and dry distilling oven is automatically discharged while the agitating and mixing means is rotated, the heating and dry distilling oven is returned verticality after completion of the automatic discharge of the residue to close the upper lid of the heating and dry distilling oven, the heating furnace body opening and closing mechanism is closed to actuate the heating and dry distilling oven heating means, and a heating, dry distilling and gasifying operation of the flakes can be automatically performed repeatedly.

Furthermore, the means for solving the present invention is the infectious medical waste treatment system according to claims 1 to 3, wherein the gas cooling and liquefying apparatus can fractionally distill low-boiling substances such as gasoline/naphtha in a first-stage gas cooling and liquefying apparatus, and fractionally distill high-boiling substances such as fuel oil/light oil in a second-stage gas cooling and liquefying apparatus, by the gas cooling and liquefying apparatus being formed into two stages.

Furthermore, means for solving the problem of the present invention is the infectious medical waste treatment system according to claims 1 to 5, wherein the gas cooling and liquefying apparatus is a multitubular heat exchanger, and is a gas cooling and liquefying apparatus with an automatic cleaning and removing function for scale in tubes that can remove the scale in all tubes at the same time by placing a movable plate in a position facing one tube plate of the multitubular heat exchanger, fastening rod-shaped members to a position facing tube opening portions on the movable plate, fastening scraper metal fittings to distal ends of the respective rod-shaped members, and reciprocating the scraper metal fittings from one tube opening portions to the other tube opening portions by reciprocating means for the movable plate, and can clean and remove scale adhering to the scraper metal fittings by placing cleaning nozzles that are connected by piping to a detergent supplying pump on a base member in a position opposing the tube opening portions in the other tube opening portions of the multitubular heat exchanger, and actuating the detergent supplying pump to inject a detergent from the cleaning nozzles when the scraper metal fittings reach the other tube opening portions.

Furthermore, the means for solving the problem of the present invention is the infectious medical waste treatment system according to claims 1 to 6, wherein chlorides/nitrides/sulfides in residual gas that cannot be liquefied in the second-stage gas cooling and liquefying apparatus are removed by the exhaust gas treatment apparatus to make the residual gas unburnt gas, a part or all of the unburnt gas is burned by an unburnt gas burner of the heating, dry distilling and gasifying apparatus, and energy cost of the heating, dry distilling and gasifying apparatus can be reduced.

Advantageous Effects of Invention

According to the present invention, plastic waste constituting approximately 80% of infectious medical waste is subjected to sterilizing, volume-reducing and detoxifying treatment by a heating and compressing operation, the aforementioned treated matters are conditioned into flakes of a fixed grain size by being shredded, the aforementioned flakes are gasified by a heating and dry distilling operation, and the aforementioned gas is cooled and liquefied, whereby products corresponding to fuel oil/light oil, and products corresponding to gasoline/naphtha can be obtained. Though methods for liquefying waste plastics by heating and dry distilling the waste plastics have been proposed so far, the present invention can propose the reasonable process integrating the sterilizing, volume-reducing and detoxifying treatment of infection medical waste to the liquefying treatment by a heating and dry distilling operation.

For the problem of treating infection medical waste, the business model of the local consumption of locally produced products, namely, "the infectious medical waste that is generated in a local area is consumed in the local area" is completed according to the present invention. If the infectious medical waste treatment system is installed in every municipality, the municipalities that have been oil-consuming municipalities can reemerge as oil-producing municipalities, and can cover a part of oil consumption, and therefore, it looks practicable that the country that does not produce oil changes to an energy-producing country that sets a good example to the world.

DETAILED DESCRIPTION OF THE INVENTION

A mode for carrying out the invention will be described.

Figure 1:
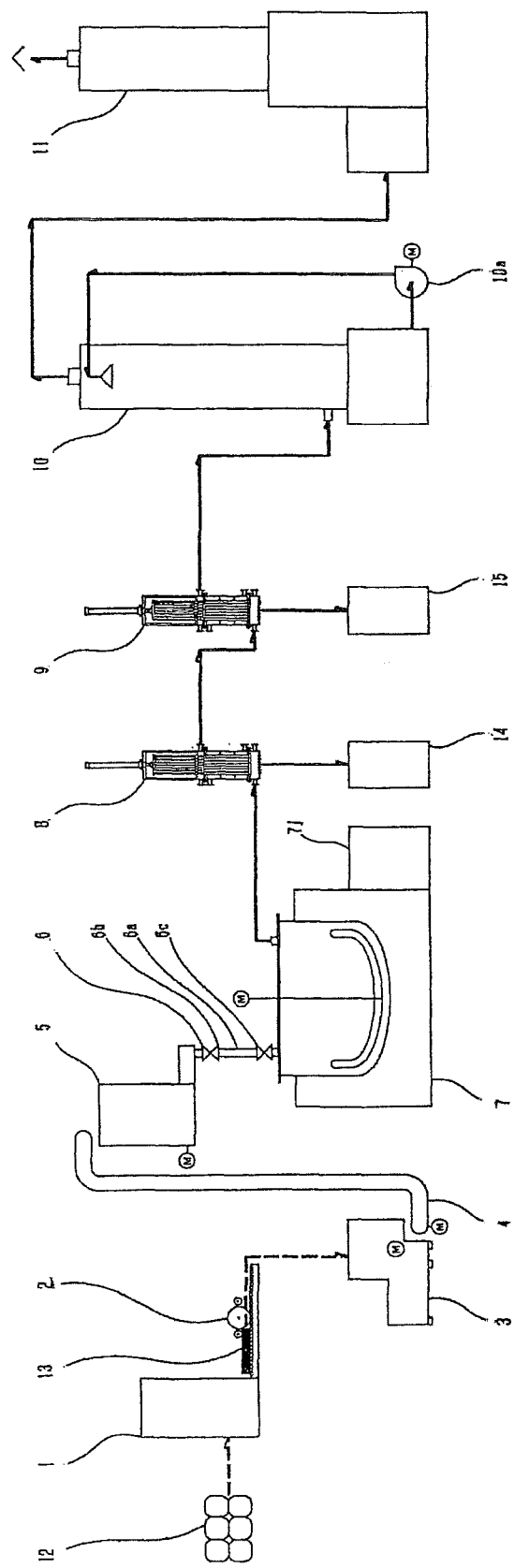
FIG. 1 is a diagram showing a flow sheet showing a specific mode of the present invention.

A specific mode of another embodiment of the present invention will be described on the basis of "FIG. 1."

An infectious medical waste treatment system of the present invention charges infectious medical waste into a treatment chamber (1b) of an infectious medical waste sterilizing and volume-reducing apparatus (1) first of all, and sterilizes, reduces in volume and detoxifies the infectious medical waste by a heating and compressing operation. The infectious medical waste that is sterilized, reduced in volume and detoxified is called a treated cake, and is in an extremely consolidated plate shape. The aforementioned plate-shaped consolidated treated cake (13) is cut into predetermined sizes with a cake cutting device (2) and is charged into a shredding device (3) to be flake-shaped matters. The aforementioned flakes are conveyed to a flake temporary storage tank (5) with a flake conveying device (4) and are stored in the aforementioned flake temporary storage tank (5). A screw conveyor (5b) is connected to a lower opening portion (5a) of the aforementioned flake temporary storage tank (5), and the aforementioned flakes are supplied to a heating, dry distilling and gasifying apparatus (7) by a sealed-type flake supplying device (6).

The aforementioned flakes that are charged into the aforementioned heating, dry distilling and gasifying apparatus (7) are gasified by high-temperature heating, are fed to a primary gas cooling and liquefying apparatus (8) that is connected by piping to the aforementioned heating, dry distilling and gasifying apparatus (7) and are cooled and liquefied to be a low-boiling liquefied product. The gas that is not liquefied in the aforementioned primary gas cooling device (8) is fed to a secondary gas cooling and liquefying apparatus (9) that is connected by piping to the aforementioned primary gas cooling and liquefying apparatus (8). The gas that is fed to the aforementioned secondary gas cooling and liquefying apparatus (9) is cooled at a temperature lower than that of the aforementioned primary gas cooling and liquefying apparatus (8) to be a high-boiling liquefied product.

The gas that is not liquefied in the aforementioned secondary gas cooling and liquefying apparatus (9) is fed to an exhaust gas treatment apparatus (10) that is connected by piping to the aforementioned secondary gas cooling and liquefying apparatus (9). The gas introduced into the aforementioned exhaust gas treatment apparatus (10) has halogen substances included in the exhaust gas and the halogen substances are removed by a counterflow-type gas cleaning method. Unburnt gas that is discharged from the aforementioned exhaust gas treatment apparatus (10) is fed to an unburnt gas combustion apparatus (11) that is connected by piping to the aforementioned exhaust gas treatment apparatus (10), and is burnt with a combustion improver, and an odor included in the unburnt gas is eliminated.

In the aforementioned infectious medical waste sterilizing and volume-reducing apparatus (1), the treatment chamber (1b) has a width of 2 m, a depth of 2 m, and a height of 1.3 m, and approximately 500 kg of infectious medical waste can be charged therein. Furthermore, heating compression conditions for sterilization and volume reduction were a temperature of 180° C. with a six-direction heating, a pressure of 2 MPa, and a heating compression time of four hours. When the heating compression time elapses, cooling water valves (1i) and (1j) of cooling solidifying means (1c, 1g) and (1d, 1h) that are contained in heating compression means in the vertical direction are automatically opened, and the infectious medical waste in a molten state is cooled and solidified to be a consolidated treated cake. In the embodiment of the present invention, the heating temperature was set at 180° C. and the pressure is set at 2 MPa, but the heating temperature and the pressure are not necessarily limited to them. In particular, the pressure may be higher than this, or lower than this.

In the aforementioned heating, dry distilling and gasifying apparatus, heating and dry distillation were continuously performed under conditions of a flake supply amount of 73 kg per hour and a heating and dry distilling temperature of 450° C. with use of the apparatus with a heating and dry distilling oven (7a) of a diameter of 2 m, a depth of 1.5 m and a nominal capacity of 3000 L, whereby the liquefaction capacity of the total of the low-boiling liquefied product and the high-boiling liquefied product was 43 kg per hour, and therefore, the resultant yield was substantially 59%. Note that the break-even point in the case of proposing the present invention to end users is stated as a liquefaction yield of 50%, and therefore, this can be evaluated as sufficiently exceeding the break-even point.

Figure 2:
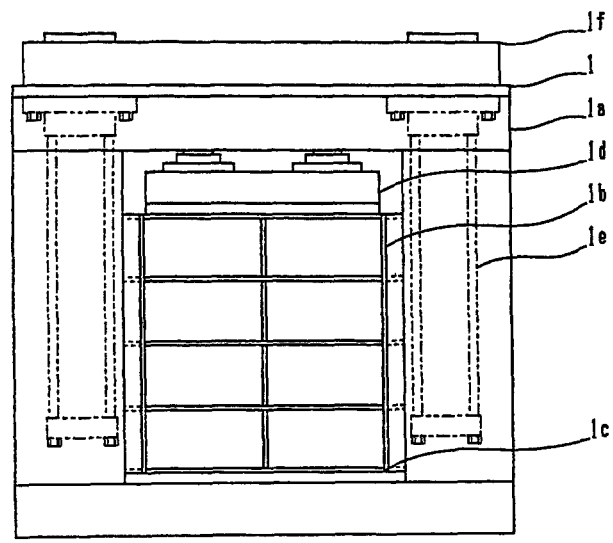
FIG. 2 is a front view of a medical waste sterilizing and volume-reducing apparatus showing the specific mode of the present invention.
Figure 3:
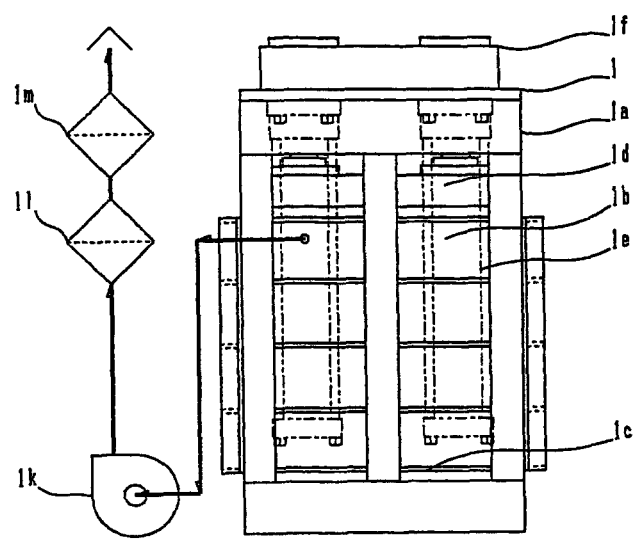
FIG. 3 is a side view of the medical waste sterilizing and volume-reducing apparatus showing the specific mode of the present invention.
Figure 4:
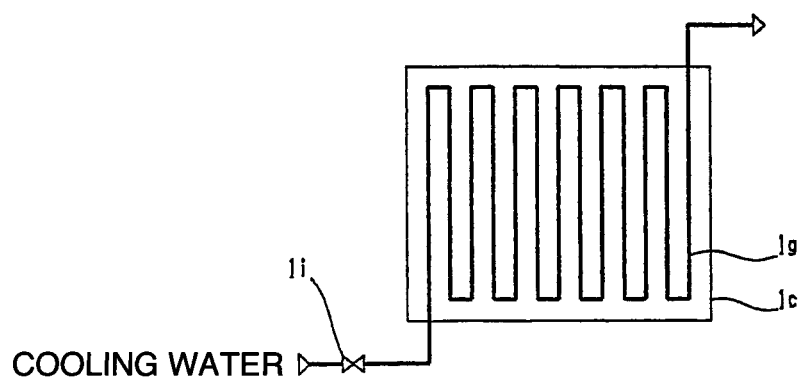
FIG. 4 is a view showing upper-side cooling and solidifying means for a treated cake showing the specific mode of the present invention.
Figure 5:
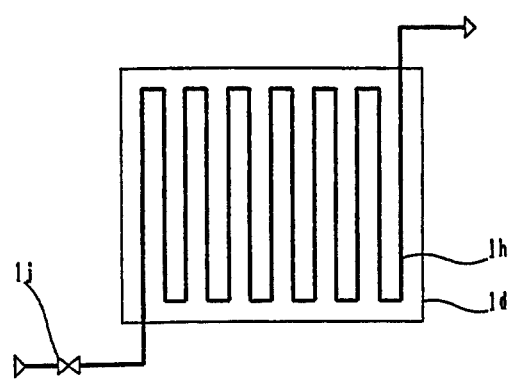
FIG. 5 is a view showing lower-side cooling and solidifying means for the treated cake showing the specific mode of the present invention.

A specific mode of another embodiment of the present invention will be described on the basis of "FIG. 2" to "FIG. 5."

The infectious medical waste sterilizing and volume-reducing apparatus (1) constituting the present invention has the prime feature in that an overwhelming percentage of the medical waste is plastics as described above, and therefore, when the medical waste is heated and compressed, the aforementioned plastics are melted and reduced in volume, but even after a predetermined heating time period elapses, if the treated cake in the treatment chamber is to be taken out, the cake is in a high-temperature molten state that is viscid, and is difficult to handle. Therefore, the cooling water valves (1i) and (1j) of bottom cooling means (1g) and top cooling means (1h) that are contained in lower-side heating and cooling means (1c) and upper-side heating and cooling means (1d) of the aforementioned infectious medical waste sterilizing and volume-reducing apparatus (1) are automatically opened, so that the infectious medical waste in the molten state can be cooled and solidified in a short time period. When the cake cooling and solidifying means like this is included, the cooling speed is enhanced significantly as compared with natural cooling, and therefore, the treatment ability of the infectious medical waste sterilizing and volume-reducing apparatus is enhanced, whereby the treatment cost can be significantly reduced.

When infectious medical waste is heated and compressed in the aforementioned infectious medical waste sterilizing and volume-reducing apparatus (1), air in a plastic bag containing the infectious medical waste is also pushed out at the same time, and therefore, the pathogenic bacteria included in the air in the aforementioned plastic bag can be captured/filtered out by an HEPA filter (1l) that is connected by piping to a discharge port of a blower (1k) by sucking the air in the aforementioned treatment chamber (1b) by connecting by piping the aforementioned treatment chamber (1b) and a suction port of the blower (1k). Furthermore, since the odor that is generated when the infectious medical waste is heated and compressed can be eliminated by an activated carbon filter (1m) that is connected by piping to the aforementioned HEPA filter (1l), the system does not cause environmental pollution and is friendly to the environment.

A specific mode of another embodiment of the present invention will be described on the basis of "FIG. 1."

The flakes in the aforementioned flake temporary storage tank (5) are supplied to a vertical cylindrical pipe (6a) by a discharge mechanism (5a) that is provided at a lower portion of the aforementioned flake temporary storage tank (5), and the flakes were enabled to be intermittently supplied by repeating an operation of opening upper opening and closing means (6b) at first, actuating the aforementioned discharge mechanism (5a) for a fixed time period next, closing the aforementioned upper opening and closing means (6b) after stopping the aforementioned discharge mechanism (5a), subsequently opening lower opening and closing means (6c) to supply the flakes inside the aforementioned vertical cylindrical pipe (6a) into the heating and dry distilling oven (7a) of the aforementioned heating, dry distilling and gasifying apparatus (7) by free-fall, and closing the aforementioned lower opening and closing means (6b).

The aforementioned heating, dry distilling and gasifying apparatus (7) always keeps a high-temperature state to perform heating, dry distillation and gasification continuously, and the generated gas by heating and dry distillation is fed to the first-stage gas cooling and liquefying apparatus (8) that is connected by piping to the aforementioned heating, dry distilling and gasifying apparatus (7). Therefore, the inside of the heating and dry distilling oven (7a) of the aforementioned heating, dry distilling and gasifying apparatus (7) is in a slightly pressurized state. In order to supply the flake-shaped raw material into the heating and dry distilling oven (7a) under the situation like this, the gas generated in the aforementioned heating and dry distilling oven (7a) must not be allowed to flow back to the flake supplying device (6) side, and by the aforementioned method, the object can be achieved.

Figure 6:
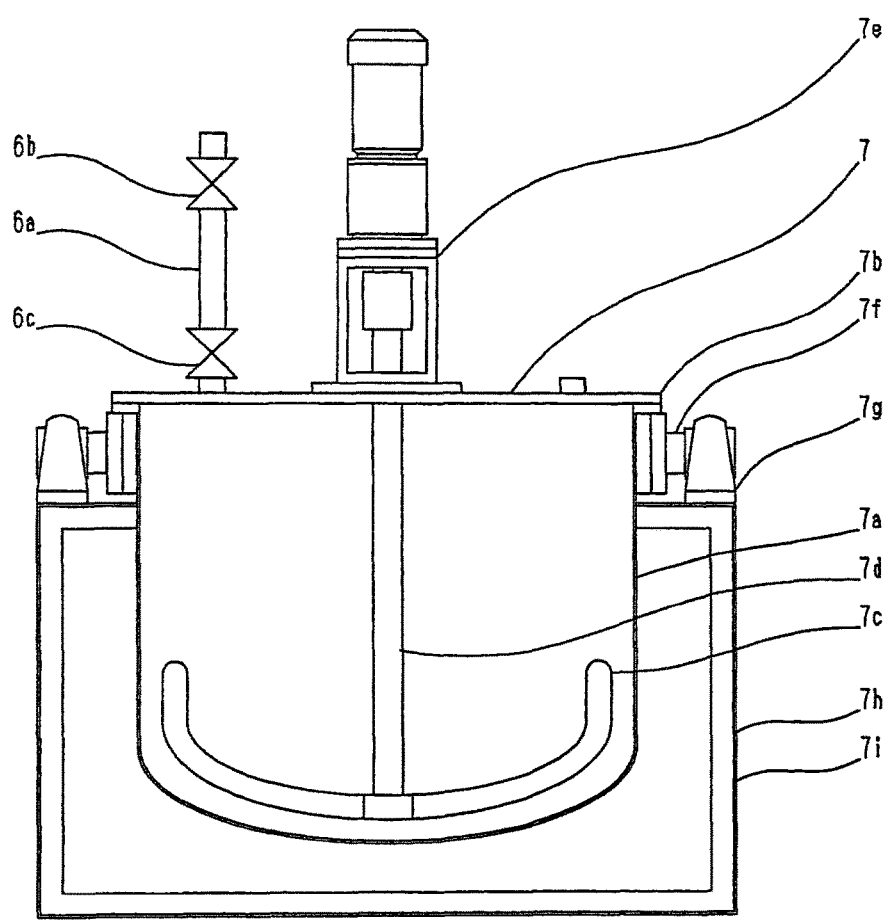
FIG. 6 is an elevation of a heating, dry distilling and gasifying apparatus showing the specific mode of the present invention.
Figure 7:
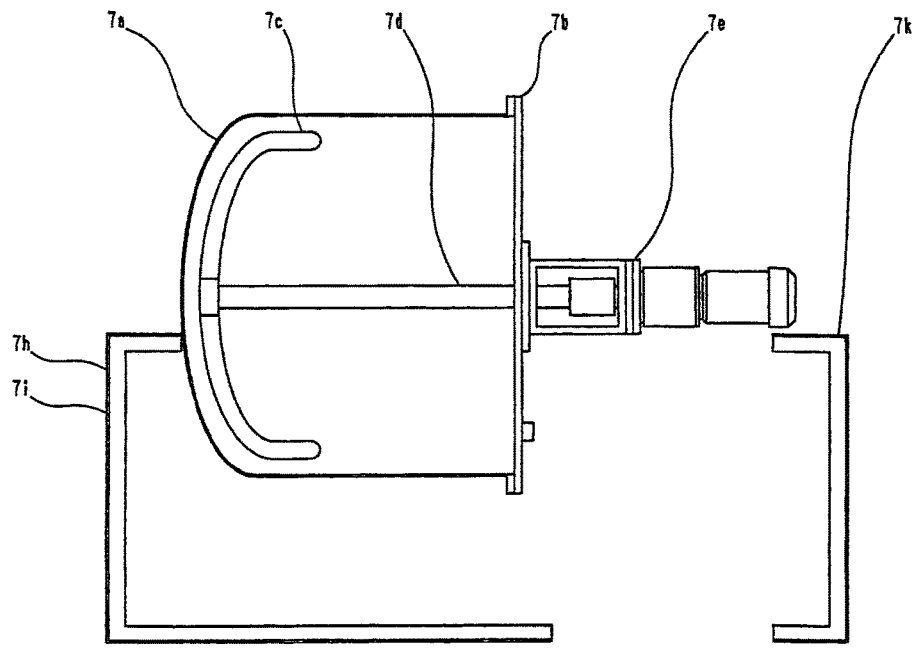
FIG. 7 is a state diagram in which a heating and dry distilling oven of the heating, dry distilling and gasifying apparatus is tilted, showing the specific mode of the present invention.
Figure 8:
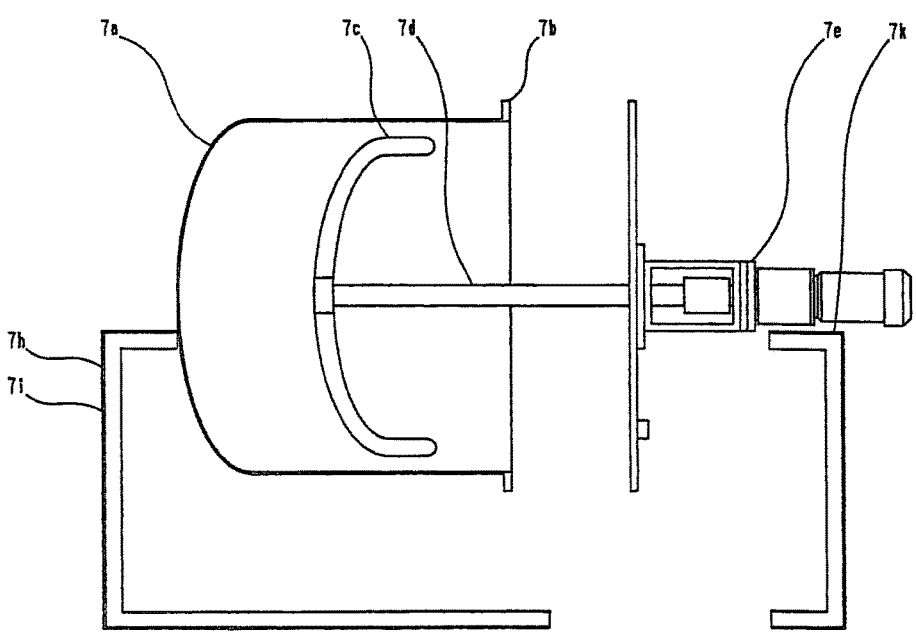
FIG. 8 is a state diagram in which the heating and dry distilling oven of the heating, dry distilling and gasifying apparatus showing the specific mode of the present invention is tilted and an upper lid is opened.

A specific mode of another embodiment of the present invention will be described on the basis of "FIG. 6" to "FIG. 8."

In the heating, dry distilling and gasifying apparatus (7) that configures the present invention, a rotary shaft (7f) is axially fitted to the heating and dry distilling oven (7a) and the aforementioned rotary shaft (7f) is rotatably supported by a bearing (7g). In a heating, dry distilling and gasifying process, plastics that constitute a overwhelming percentage of infectious medical waste are gasified, but there is the possibility of inclusion of cotton bands, glass dropper bottles, metallic injection needles/scalpels/forceps and the like, and they cannot be gasified and remain in the bottom of the oven as a residue. Thus, the present invention adopts a mechanism that regularly stops a heating and dry distilling operation, opens parts of a heating furnace casing (7h) and an heat insulator (7i) with which a periphery of the heating and dry distilling oven is covered, with heating furnace opening and closing means (7k), tilts the aforementioned heating and dry distilling casing (7a) horizontally or more next, gradually opens the upper lid (7b) of the aforementioned heating and dry distilling oven (7a), simultaneously rotates an agitating blade (7c) to discharge the residue in the oven bottom automatically, returns the aforementioned heating and dry distilling oven (7a) to a verticality after completion of the discharge, and closes the aforementioned upper lid (7b).

In order to discharge the residue that is substances difficult to be gasified that accumulate in the heating and dry distilling oven of the heating, dry distilling and gasifying apparatus, the method that provides a screw-type discharge mechanism at a heating and dry distilling oven bottom portion is generally adopted, but according to the method like this, tar that is generated at the time of heating and dry distilling adheres to a screw groove of the screw discharge mechanism to be difficult to discharge, and metallic pieces such as scalpels and forceps for surgery that are included in the medical waste are caught by the screw and become the cause of a failure. In contrast with this, the aforementioned method is a method that is the most suitable for the situation though it is extremely primitive.

Figure 9:
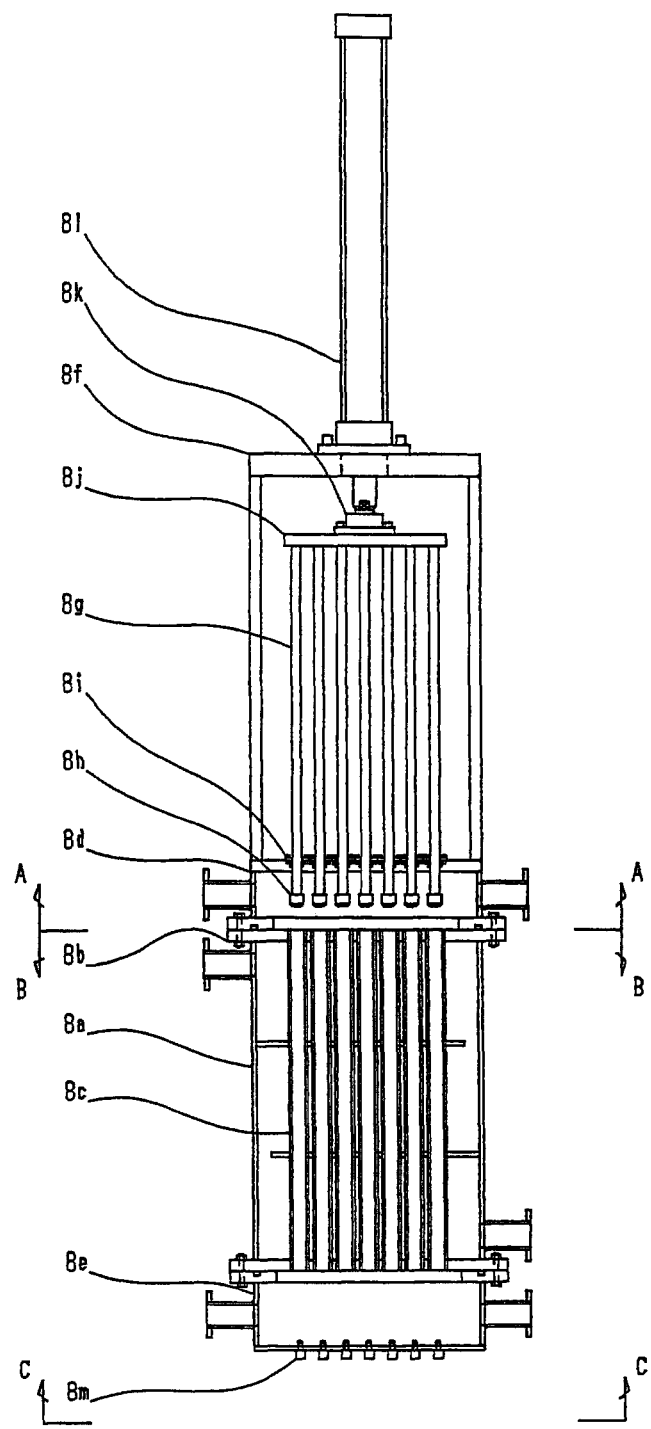
FIG. 9 is a sectional elevation of a gas cooling and liquefying apparatus of the present invention.
Figure 10:
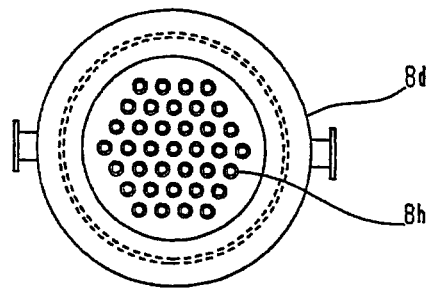
FIG. 10 is a view seen along arrows A-A of the gas cooling and liquefying apparatus of the present invention.
Figure 11:
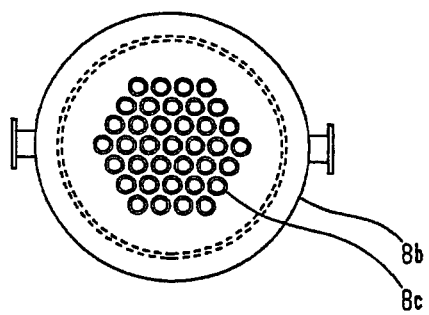
FIG. 11 is a view seen along arrows B-B of the gas cooling and liquefying apparatus of the present invention.
Figure 12:
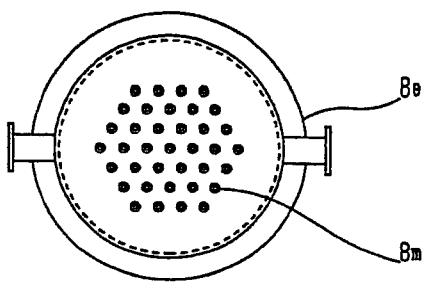
FIG. 12 is a view seen along arrows C-C of the gas cooling and liquefying apparatus of the present invention.

A specific mode of another embodiment of the present invention will be described on the basis of "FIG. 9" to "FIG. 12."

As for the first-stage gas cooling and liquefying apparatus (8) and the second-stage gas cooling and liquefying apparatus (9) that configure the present invention, there is the possibility of generation of soot when pellets are heated and dry distilled in the heating, dry distilling and gasifying apparatus (7). Therefore, the soot generated in the heating and dry distilling oven (7a) is fed to the first-stage gas cooling and liquefying apparatus (8) that is connected by piping to the aforementioned heating and dry distilling oven (7a), and then the soot that is included in the fed gas may adhere to an inner wall of a tube (8c) of the aforementioned first-stage gas cooling and liquefying apparatus (8) to reduce a heat exchanging ability of the aforementioned first-stage gas cooling and liquefying apparatus (8). Furthermore, the soot that passes through the aforementioned first-stage gas cooling and liquefying apparatus (8) also reaches the second-stage gas cooling and liquefying apparatus (9), and the soot may adhere to the inner wall of the tube (not illustrated) similarly to the aforementioned first-stage gas cooling and liquefying apparatus (8) to reduce the heat exchanging ability of the aforementioned second-stage gas cooling and liquefying apparatus (9).

In such a case, an operation of the first-stage gas cooling and liquefying apparatus (8) is stopped in general, and the aforementioned gas cooling and liquefying apparatus is dissembled to remove the soot that adheres to the inner wall of the tube (8*c*). However, such an operation not only requires labor and time, but also significantly reduces availability of the apparatus, and therefore, in the other embodiment of the present invention, the inner wall of the aforementioned tube (8*c*) is also enabled to be cleaned during an operation of the gas cooling and liquefying apparatus (8). Specifically, a rod-shaped member (8*h*) with a scraper metal fitting (8*b*) that is reciprocal in the aforementioned tube (8*c*) being bound thereto is provided at a position facing the tube (8*c*) that is placed on a tube plate (8*b*) of the aforementioned gas cooling and liquefying apparatus (8), so that the soot adhering to the inner wall of the tube (8*c*) can be removed in a short time period by regularly reciprocating a hydraulic cylinder (8*l*) that is reciprocating means for the aforementioned scraper metal fitting (8*b*).

Furthermore, when the aforementioned scraper metal fitting (8*g*) reaches the other tube opening portion (not illustrated) by the reciprocating means of the hydraulic cylinder (8*l*), a detergent is injected from a cleaning nozzle (8*m*) that is placed in a lower chamber (8*e*) that faces the other tube opening portion to be able to clean the soot adhering to the aforementioned scraper metal fitting (8*g*), and therefore, the trouble can be prevented, in which the soot adhering to the aforementioned scraper metal fitting (8*g*) adheres to the inside of the aforementioned tube (8*c*) again when the aforementioned scraper metal fitting (8*g*) returns. Note that the same method was also adopted in the second-stage gas cooling and liquefying apparatus (9).

Figure 13:
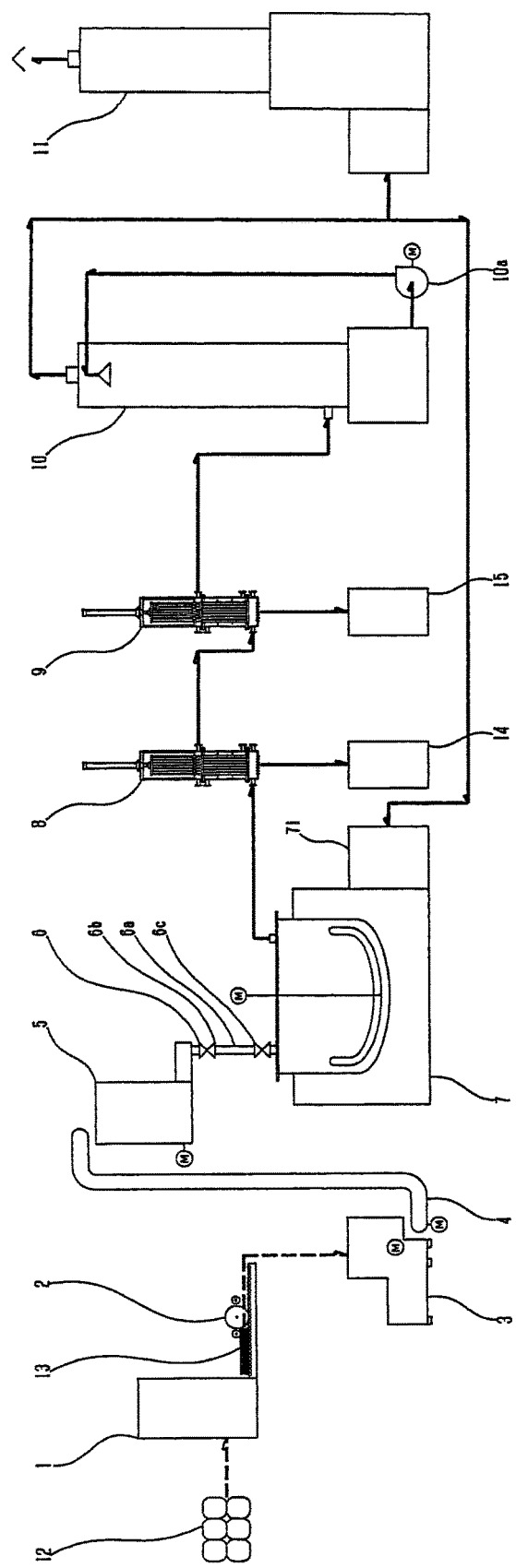
FIG. 13 is a diagram showing a flow sheet showing a specific mode of the present invention.

A specific mode of another embodiment of the present invention will be described on the basis of "FIG. 13."

The residual gas that cannot be liquefied in the aforementioned second-stage gas cooling and liquefying apparatus (9) is made unburnt gas by removing chloride, nitride and sulfide with the aforementioned exhaust gas treatment apparatus (10), and a part or all of the aforementioned unburnt gas is combusted with an unburnt gas burner (7*l*) of the aforementioned heating, dry distilling and gasifying apparatus (7).

In this manner, not only the energy cost of the aforementioned heating, dry distilling and gasifying apparatus (7) can be reduced, but also the amount of the gas that is fed to the unburnt gas combustion apparatus (1*l*) side is made as closer to zero as possible to achieve a closed process by accurately grasping the amount of the unburnt gas, and the system becomes extremely friendly to the environment.

INDUSTRIAL APPLICABILITY

While a number of methods for liquefying waste plastics by heating and dry distilling the plastics have been proposed so far, the present invention can propose a reasonable process integrating the sterilizing, volume-reducing and detoxifying treatment of infectious medical waste to the liquefying treatment by a heating and dry distilling operation. According to the present invention, "the infectious medical waste generated in a local area is subjected to sterilizing, volume-reducing and detoxifying treatment completely in the local area, and further is liquefied by a heating and dry distilling operation," whereby the route of energy recycle can be established.

REFERENCE SINGS LIST

1 infectious medical waste sterilizing and volume-reducing apparatus
1*a* gate type frame
1*b* casing provided with vertical cylindrical door (treatment chamber in the description)
1*c* lower-side heating and cooling means
1*d* upper-side heating and cooling means
1*e* hydraulic cylinder
1*f* cylinder synchronized member
1*g* bottom cooling means
1*h* top cooling means
1*i* cooling water valves
1*j* cooling water valves
1*k* blower
1*l* HEPA filter
1*m* activated carbon filter
2 cake cutting device
2*a* power conveyor
2*b* cutting machine
2*c* feeding roller
2*d* receiving roller
3 shredding device
4 flake conveying device
5 temporary storage tank
5*a* lower opening portion
5*b* screw conveyor
6 sealed-type flake supplying device
6*a* vertical cylindrical pipe
6*b* upper opening and closing means
6*c* lower opening and closing means
7 gasifying apparatus
7*a* dry distilling oven
7*b* upper lid
7*c* agitating blade
7*d* agitating axis
7*e* motor provided with reducer
7*f* rotary shaft
7*g* bearing
7*h* heating furnace casing
7*i* insulator
7*j* heating means for heating furnace
7*k* heating furnace opening and closing means
7*l* unburnt gas burner
8 primary gas cooling and liquefying apparatus
8*a* heat exchanger shell
8*b* tube plate
8*c* tube
8*d* upper chamber
8*e* lower chamber
8*f* frame
8*g* scraper metal fitting
8*h* rod-shaped member
8*i* axis seal portion
8*j* movable plate
8*k* adaptor
8*l* hydraulic cylinder 8m cleaning nozzle
9 secondary gas cooling and liquefying apparatus
10 exhaust gas treatment apparatus
10a circulating pump
11 unburnt gas combustion apparatus
12 infectious medical waste
13 treated cake
14 primary petroleum material
15 secondary petroleum material

The invention claimed is:

1. An infectious medical waste treatment system, comprising:
an infectious medical waste sterilizing and volume-reducing apparatus including a heating and compressing device for sterilizing, reducing in volume and detoxifying plastic infectious medical waste by heating and compressing the infectious medical waste;
a cake cutting device including a cutter for cutting a treated cake that is obtained by performing sterilization, volume-reduction and detoxification by heating and compression in the infectious medical waste sterilizing and volume-reducing apparatus, into an arbitrary size;
a cake shredding device including a shredder for shredding the treated cake cut in the cake cutting device into a fixed grain size;
a flake conveying device including a conveyor for conveying flakes obtained by shredding in the cake shredding device;
a flake temporary storage tank with a discharge mechanism for temporarily storing the flakes that are conveyed by the flake conveying device;
a sealed-type flake supplying device including a sealed-type supplier for supplying the flakes that are supplied from the flake temporary storage tank to a heating, dry distilling and gasifying apparatus;
the heating, dry distilling and gasifying apparatus is for heating and dry distilling the flakes that are supplied by the sealed-type flake supplying device to gasify the flakes;
a gas cooling and liquefying apparatus including a gas cooling and liquefier connected by piping to the heating, dry distilling and gasifying apparatus for cooling and liquefying gas that is generated in the heating, dry distilling and gasifying apparatus;
an exhaust gas treatment apparatus including a remover connected by piping to the gas cooling and liquefying apparatus for removing chloride, nitride and sulfide included in residual gas that is not liquefied by the gas cooling and liquefying apparatus;
an unburnt gas combustion apparatus connected by piping to the exhaust gas treatment apparatus for burning unburnt gas that is discharged from the exhaust gas treatment apparatus and removing odor; and
a system control device including a system controller for electrically interlocking and integrally controlling the infectious medical waste treatment apparatus, the cake cutting device, the cake shredding device, the flake conveying device, the flake temporary storage tank, the sealed-type flake supplying device, the heating, dry distilling and gasifying apparatus, the gas cooling and liquefying apparatus, the exhaust gas treatment apparatus, an unburnt gas burner and the unburnt gas combustion apparatus;
wherein the gas cooling and liquefying apparatus is a multitubular heat exchanger, and is a gas cooling and liquefying apparatus with an automatic cleaning and removing function for scale on tubes that can remove the scale on all tubes at the same time by placing a movable plate in a position facing one tube plate of the multitubular heat exchanger, fastening rod-shaped members to a position facing tube opening portions on the movable plate, fastening scraper metal fittings to distal ends of the respective rod-shaped members, and reciprocating the scraper metal fittings from one tube opening portions to the other tube opening portions by a reciprocator for the movable plate, and can clean and remove scale adhering to the scraper metal fittings by placing cleaning nozzles that are connected by piping to a detergent supplying pump on a base member in a position opposing the tube opening portions in the other tube opening portions of the multitubular heat exchanger, and actuating the detergent supplying pump to inject a detergent from the cleaning nozzles when the scraper metal fittings reach the other tube opening portions.

2. The infectious medical waste treatment system according to claim 1,
wherein the heating, dry distilling and gasifying apparatus comprises a heating and dry distilling oven for heating and dry distilling the flakes to gasify the flakes, a heating furnace body opening and closing mechanism capable of opening and closing a part of a heating furnace body to heat the heating and dry distilling oven, an agitator and mixer for effectively heating the flakes in the heating and dry distilling oven by bringing the flakes into contact with an inner wall of the heating and dry distilling oven uniformly, and an automatic residue discharger for automatically discharging a residue in the heating and dry distilling oven by gradually opening an upper lid of the heating and dry distilling oven while tilting the heating and dry distilling oven and rotating the agitator and mixer, and
when the heating, dry distilling and gasifying apparatus heats, dry distills and gasifies the flakes continuously for a fixed time period, and thereafter, matters difficult to be gasified contained in the flakes accumulate as a residue in the heating and dry distilling oven, the heating and dry distilling oven is stopped to open a part of a heating furnace with the heating furnace body opening and closing mechanism, the heating and dry distilling oven is tilted to open the upper lid of the heating and dry distilling oven gradually, at the same time, the residue in the heating and dry distilling oven is automatically discharged while the agitator and mixer is rotated, the heating and dry distilling oven is returned to a verticality after completion of the automatic discharge of the residue to close the upper lid of the heating and dry distilling oven, the heating furnace body opening and closing mechanism is closed to actuate the heating and dry distilling oven, and a heating, dry distilling and gasifying operation of the flakes can be automatically performed repeatedly.

3. The infectious medical waste treatment system according to claim 1,
wherein the gas cooling and liquefying apparatus can fractionally distill low-boiling substances in a first-stage gas cooling and liquefying apparatus, and fractionally distill high-boiling substances in a second-stage gas cooling and liquefying apparatus, by the gas cooling and liquefying apparatus being formed into two stages.

4. The infectious medical waste treatment system according to claim 1, wherein the gas cooling and liquefying apparatus can fractionally distill low-boiling substances in a first-stage gas cooling and liquefying apparatus, and fractionally distill high-boiling substances in a second-stage gas cooling and liquefying apparatus by the gas cooling and liquefying apparatus being formed into two stages, chlorides, nitrides and sulfides in residual gas that cannot be liquefied in the second-stage gas cooling and liquefying apparatus are removed by the exhaust gas treatment apparatus to make the residual gas unburnt gas, a part or all of the unburnt gas is burned by an unburnt gas burner of the heating, dry distilling and gasifying apparatus, and energy cost of the heating, dry distilling and gasifying apparatus can be reduced.

5. The infectious medical waste treatment system according to claim 1, wherein the sealed-type flake supplying device is a vertical cylindrical pipe connecting the flake temporary storage tank and the heating, dry distilling and gasifying apparatus, with the vertical cylindrical pipe being provided with an upper-side opening and closing device and a lower-side opening and closing device capable of opening and closing a flow path of the vertical cylindrical pipe, and can intermittently supply the flakes to the heating, dry distilling and gasifying apparatus while a sealed state of the heating, dry distilling and gasifying apparatus is kept by repeating an operation of initially opening the upper-side opening and closing device to actuate the discharge mechanism of the flake temporary storage tank to supply the flakes for a fixed time period and stopping the discharge mechanism of the flake temporary storage tank, thereafter, closing the upper-side opening and closing device, subsequently opening the lower-side opening and closing device to cause the flakes to fall freely to the heating, dry distilling and gasifying apparatus, and thereafter closing the lower-side opening and closing device, and the heating, dry distilling and gasifying apparatus comprises a heating and dry distilling oven for heating and dry distilling the flakes to gasify the flakes, the heating and dry distilling oven including a heating furnace body opening and closing mechanism capable of opening and closing a part of a heating furnace body to heat the heating and dry distilling oven, an agitator and mixer for effectively heating the flakes in the heating and dry distilling oven by bringing the flakes into contact with an inner wall of the heating and dry distilling oven uniformly, and an automatic residue discharger for automatically discharging a residue in the heating and dry distilling oven by gradually opening an upper lid of the heating and dry distilling oven while tilting the heating and dry distilling oven and rotating the agitator and mixer, and when the heating, dry distilling and gasifying apparatus heats, dry distills and gasifies the flakes continuously for a fixed time period, and thereafter, matters difficult to be gasified contained in the flakes accumulate as a residue in the heating and dry distilling oven, the heating and dry distilling oven is stopped to open a part of a heating furnace with the heating furnace body opening and closing mechanism, the heating and dry distilling oven is tilted to open the upper lid of the heating and dry distilling oven gradually, at the same time, the residue in the heating and dry distilling oven is automatically discharged while the agitator and mixer is rotated, the heating and dry distilling oven is returned to a verticality after completion of the automatic discharge of the residue to close the upper lid of the heating and dry distilling oven, the heating furnace body opening and closing mechanism is closed to actuate the heating and dry distilling oven, and a heating, dry distilling and gasifying operation of the flakes can be automatically performed repeatedly.

6. The infectious medical waste treatment system according to claim 1, wherein the sealed-type flake supplying device is a vertical cylindrical pipe connecting the flake temporary storage tank and the heating, dry distilling and gasifying apparatus, with the vertical cylindrical pipe being provided with an upper-side opening and closing device and a lower-side opening and closing device capable of opening and closing a flow path of the vertical cylindrical pipe, and can intermittently supply the flakes to the heating, dry distilling and gasifying apparatus while a sealed state of the heating, dry distilling and gasifying apparatus is kept by repeating an operation of initially opening the upper-side opening and closing device to actuate the discharge mechanism of the flake temporary storage tank to supply the flakes for a fixed time period and stopping the discharge mechanism of the flake temporary storage tank, thereafter, closing the upper-side opening and closing device, subsequently opening the lower-side opening and closing device to cause the flakes to fall freely to the heating, dry distilling and gasifying apparatus, and thereafter closing the lower-side opening and closing device, the heating, dry distilling and gasifying apparatus comprises a heating and dry distilling oven for heating and dry distilling the flakes to gasify the flakes, a heating and dry distilling oven heater including a heating furnace body opening and closing mechanism capable of opening and closing a part of a heating furnace body to heat the heating and dry distilling oven, an agitator and mixer for effectively heating the flakes in the heating and dry distilling oven by bringing the flakes into contact with an inner wall of the heating and dry distilling oven uniformly, and an automatic residue discharger for automatically discharging a residue in the heating and dry distilling oven by gradually opening an upper lid of the heating and dry distilling oven while tilting the heating and dry distilling oven and rotating the agitator and mixer, and when the heating, dry distilling and gasifying apparatus heats, dry distills and gasifies the flakes continuously for a fixed time period, and thereafter, matters difficult to gasify contained in the flakes accumulate as a residue in the heating and dry distilling oven, the heating and dry distilling oven heater is stopped to open a part of a heating furnace with the heating furnace body opening and closing mechanism, the heating and dry distilling oven is tilted to open the upper lid of the heating and dry distilling oven gradually, at the same time, the residue in the heating and dry distilling oven is automatically discharged while the agitator and mixer is rotated, the heating and dry distilling oven is returned to a verticality after completion of the automatic discharge of the residue to close the upper lid of the heating and dry distilling oven, the heating furnace body opening and closing mechanism is closed to actuate the heating and dry distilling oven heater, and a heating, dry distilling and gasifying operation of the flakes can be automatically performed repeatedly, and the gas cooling and liquefying apparatus can fractionally distill low-boiling substances in a first-stage gas cooling and liquefying apparatus, and fractionally distill high-boiling substances in a second-stage gas cooling and liquefying apparatus, by the gas cooling and liquefying apparatus formed into two stages.

7. The infectious medical waste treatment system according to claim 1,
wherein the sealed-type flake supplying device is a vertical cylindrical pipe connecting the flake temporary storage tank and the heating, dry distilling and gasifying apparatus, with the vertical cylindrical pipe being provided with an upper-side opening and closing device and a lower-side opening and closing device capable of opening and closing a flow path of the vertical cylindrical pipe, and can intermittently supply the flakes to the heating, dry distilling and gasifying apparatus while a sealed state of the heating, dry distilling and gasifying apparatus is kept by repeating an operation of initially opening the upper-side opening and closing device to actuate the discharge mechanism of the flake temporary storage tank to supply the flakes for a fixed time period and stopping the discharge mechanism of the flake temporary storage tank, thereafter, closing the upper-side opening and closing device, subsequently opening the lower-side opening and closing device to cause the flakes to fall freely to the heating, dry distilling and gasifying apparatus, and thereafter closing the lower side opening and closing device, the heating, dry distilling and gasifying apparatus comprises a heating and dry distilling oven for heating and dry distilling the flakes to gasify the flakes, a heating and dry distilling oven heater including a heating furnace body opening and closing mechanism capable of opening and closing a part of a heating furnace body to heat the heating and dry distilling oven, an agitator and mixer for effectively heating the flakes in the heating and dry distilling oven by bringing the flakes into contact with an inner wall of the heating and dry distilling oven uniformly, and an automatic residue discharger for automatically discharging a residue in the heating and dry distilling oven by gradually opening an upper lid of the heating and dry distilling oven while tilting the heating and dry distilling oven and rotating the agitator and mixer, and when the heating, dry distilling and gasifying apparatus heats, dry distills and gasifies the flakes continuously for a fixed time period, and thereafter, matters difficult to be gasified contained in the flakes accumulate as a residue in the heating and dry distilling oven, the heating and dry distilling oven heater is stopped to open a part of a heating furnace with the heating furnace body opening and closing mechanism, the heating and dry distilling oven is tilted to open the upper lid of the heating and dry distilling oven gradually, at the same time, the residue in the heating and dry distilling oven is automatically discharged while the agitator and mixer is rotated, the heating and dry distilling oven is returned to a verticality after completion of the automatic discharge of the residue to close the upper lid of the heating and dry distilling oven, the heating furnace body opening and closing mechanism is closed to actuate the heating and dry distilling oven heater, and a heating, dry distilling and gasifying operation of the flakes can be automatically performed repeatedly, the gas cooling and liquefying apparatus can fractionally distill low-boiling substances in a first-stage gas cooling and liquefying apparatus, and fractionally distill high-boiling substances in a second-stage gas cooling and liquefying apparatus, by the gas cooling and liquefying apparatus being formed into two stages.

8. The infectious medical waste treatment system according to claim 1,
wherein the sealed-type flake supplying device is a vertical cylindrical pipe connecting the flake temporary storage tank and the heating, dry distilling and gasifying apparatus, with the vertical cylindrical pipe being provided with an upper-side opening and closing device and a lower-side opening and closing device capable of opening and closing a flow path of the vertical cylindrical pipe, and can intermittently supply the flakes to the heating, dry distilling and gasifying apparatus while a sealed state of the heating, dry distilling and gasifying apparatus is kept by repeating an operation of initially opening the upper-side opening and closing device to actuate the discharge mechanism of the flake temporary storage tank to supply the flakes for a fixed time period and stopping the discharge mechanism of the flake temporary storage tank, thereafter, closing the upper-side opening and closing device, subsequently opening the lower-side opening and closing device to cause the flakes to fall freely to the heating, dry distilling and gasifying apparatus, and thereafter closing the lower-side opening and closing device, the heating, dry distilling and gasifying apparatus comprises a heating and dry distilling oven for heating and dry distilling the flakes to gasify the flakes, a heating and dry distilling oven heating device including a heating furnace body opening and closing mechanism capable of opening and closing a part of a heating furnace body to heat the heating and dry distilling oven, an agitator and mixer for effectively heating the flakes in the heating and dry distilling oven by bringing the flakes into contact with an inner wall of the heating and dry distilling oven uniformly, and an automatic residue discharger for automatically discharging a residue in the heating and dry distilling oven by gradually opening an upper lid of the heating and dry distilling oven while tilting the heating and dry distilling oven and rotating the agitator and mixer, and when the heating, dry distilling and gasifying apparatus heats, dry distills and gasifies the flakes continuously for a fixed time period, and thereafter, matters difficult to be gasified contained in the flakes accumulate as a residue in the heating and dry distilling oven, the heating and dry distilling oven heater is stopped to open a part of a heating furnace with the heating furnace body opening and closing mechanism, the heating and dry distilling oven is tilted to open the upper lid of the heating and dry distilling oven gradually, at the same time, the residue in the heating and dry distilling oven is automatically discharged while the agitating and mixing device is rotated, the heating and dry distilling oven is returned to a verticality after completion of the automatic discharge of the residue to close the upper lid of the heating and dry distilling oven, the heating furnace body opening and closing mechanism is closed to actuate the heating and dry distilling oven heater, and a heating, dry distilling and gasifying operation of the flakes can be automatically performed repeatedly, the gas cooling and liquefying apparatus can fractionally distill low-boiling substances in a first-stage gas cooling and liquefying apparatus, and fractionally distill high-boiling substances in a second-stage gas cooling and liquefying apparatus, by the gas cooling and liquefying apparatus being formed into two stages, and chlorides, nitrides and sulfides in residual gas that cannot be liquefied in the second-stage gas cooling and liquefying apparatus are removed by the exhaust gas treatment apparatus to make the residual gas unburnt gas, a part or all of the unburnt gas is burned by an unburnt gas burner of the heating, dry distilling and gasifying apparatus, and energy cost of the heating, dry distilling and gasifying apparatus can be reduced.

9. An infectious medical waste treatment system, comprising:
   an infectious medical waste sterilizing and volume-reducing apparatus including a heating and compressing device for sterilizing, reducing in volume and detoxifying plastic infectious medical waste by heating and compressing the infectious medical waste;
   a cake cutting device including a cutter for cutting a treated cake that is obtained by performing sterilization, volume-reduction and detoxification by heating and compression in the infectious medical waste sterilizing and volume-reducing apparatus, into an arbitrary size;
   a cake shredding device including a shredder for shredding the treated cake cut by the cake cutting device into a fixed grain size;
   a flake conveying device including a conveyor for conveying flakes obtained by shredding in the cake shredding device;
   a flake temporary storage tank with a discharge mechanism for temporarily storing the flakes that are conveyed by the flake conveying device;
   a sealed-type flake supplying device including a sealed-type supplier for supplying the flakes that are supplied from the flake temporary storage tank to a heating, dry distilling and gasifying apparatus;
   the heating, dry distilling and gasifying apparatus is for heating and dry distilling the flakes that are supplied by the sealed-type flake supplying device to gasify the flakes;
   a gas cooling and liquefying apparatus including a gas cooling and liquefier connected by piping to the heating, dry distilling and gasifying apparatus for cooling and liquefying gas that is generated in the heating, dry distilling and gasifying apparatus;
   an exhaust gas treatment apparatus including a remover connected by piping to the gas cooling and liquefying apparatus for removing chloride, nitride and sulfide included in residual gas that is not liquefied by the gas cooling and liquefying apparatus;
   an unburnt gas combustion apparatus connected by piping to the exhaust gas treatment apparatus for burning unburnt gas that is discharged from the exhaust gas treatment apparatus and removing odor; and
   a system control device including a system controller for electrically interlocking and integrally controlling the infectious medical waste treatment apparatus, the cake cutting device, the cake shredding device, the flake conveying device, the flake temporary storage tank, the sealed-type flake supplying device, the heating, dry distilling and gasifying apparatus, the gas cooling and liquefying apparatus, the exhaust gas treatment apparatus, an unburnt gas burner and the unburnt gas combustion apparatus, and
   the infectious medical waste sterilizing and volume-reducing apparatus including a treated-cake cooling and solidifying device in the heating and compressing device to obtain a consolidated treated cake by cooling treated matter after the infectious medical waste is subjected to sterilizing, volume-reducing and detoxifying treatment by a heating and compressing operation, includes a gas filter that filters out by an HEPA filter pathogenic bacteria included in generated gas during heating and compressing the infectious medical waste in the heating and compressing device, further includes a filter that filters out odor included in the generated gas with an activated carbon filter, and can purify the generated gas;
   wherein the gas cooling and liquefying apparatus is a multitubular heat exchanger, and is a gas cooling and liquefying apparatus with an automatic cleaning and removing function for scale on tubes that can remove the scale on all tubes at the same time by placing a movable plate in a position facing one tube plate of the multitubular heat exchanger, fastening rod-shaped members to a position facing tube opening portions on the movable plate, fastening scraper metal fittings to distal ends of the respective rod-shaped members, and reciprocating the scraper metal fittings from one tube opening portions to the other tube opening portions by a reciprocator for the movable plate, and can clean and remove scale adhering to the scraper metal fittings by placing cleaning nozzles that are connected by piping to a detergent supplying pump on a base member in a position opposing the tube opening portions in the other tube opening portions of the multitubular heat exchanger, and actuating the detergent supplying pump to inject a detergent from the cleaning nozzles when the scraper metal fittings reach the other tube opening portions.

10. The infectious medical waste treatment system according to claim 9,
    wherein the sealed-type flake supplying device is a vertical cylindrical pipe connecting the flake temporary storage tank and the heating, dry distilling and gasifying apparatus, with the vertical cylindrical pipe being provided with an upper-side opening and closing device and a lower-side opening and closing device capable of opening and closing a flow path of the vertical cylindrical pipe, and can intermittently supply the flakes to the heating, dry distilling and gasifying apparatus while a sealed state of the heating, dry distilling and gasifying apparatus is kept by repeating an operation of initially opening the upper-side opening and closing device to actuate the discharge mechanism of the flake temporary storage tank to supply the flakes for a fixed time period and stopping the discharge mechanism of the flake temporary storage tank, thereafter, closing the upper-side opening and closing device, subsequently opening the lower-side opening and closing device to cause the flakes to fall freely to the heating, dry distilling and gasifying apparatus, and thereafter closing the lower-side opening and closing device.

11. The infectious medical waste treatment system according to claim 9,
    wherein the heating, dry distilling and gasifying apparatus comprises a heating and dry distilling oven for heating and dry distilling the flakes to gasify the flakes, a heating and dry distilling oven heating device including a heating furnace body opening and closing mechanism capable of opening and closing a part of a heating furnace body to heat the heating and dry distilling oven, an agitator and mixer for effectively heating the flakes in the heating and dry distilling oven by bringing the flakes into contact with an inner wall of the heating and dry distilling oven uniformly, and an automatic residue discharger for automatically discharging a residue in the heating and dry distilling oven by gradually opening an upper lid of the heating and dry distilling oven while tilting the heating and dry distilling oven and rotating the agitator and mixer, and when the heating, dry distilling and gasifying apparatus heats, dry distills and gasifies the flakes continuously for a fixed time period, and thereafter, matters difficult to be gasified contained in the flakes accumulate as a residue in the heating and dry distilling oven, the heating and dry distilling oven heating device is stopped to open a part of a heating furnace with the heating furnace body opening and closing mechanism, the heating and dry distilling oven is tilted to open the upper lid of the heating and dry distilling oven gradually, at the same time, the residue in the heating and dry distilling oven is automatically discharged while the agitator and mixer is rotated, the heating and dry distilling oven is returned to a verticality after completion of the automatic discharge of the residue to close the upper lid of the heating and dry distilling oven, the heating furnace body opening and closing mechanism is closed to actuate the heating and dry distilling oven heating device, and a heating, dry distilling and gasifying operation of the flakes can be automatically performed repeatedly.

12. The infectious medical waste treatment system according to claim 9,
wherein the gas cooling and liquefying apparatus can fractionally distill low-boiling substances in a first-stage gas cooling and liquefying apparatus, and fractionally distill high-boiling substances in a second-stage gas cooling and liquefying apparatus, by the gas cooling and liquefying apparatus formed into two stages.

13. The infectious medical waste treatment system according to claim 9,
wherein the gas cooling and liquefying apparatus can fractionally distill low-boiling substances in a first-stage gas cooling and liquefying apparatus, and fractionally distill high-boiling substances in a second-stage gas cooling and liquefying apparatus, by the gas cooling and liquefying apparatus being formed into two stages, chlorides, nitrides and sulfides in residual gas that cannot be liquefied in the second-stage gas cooling and liquefying apparatus are removed by the exhaust gas treatment apparatus to make the residual gas unburnt gas, a part or all of the unburnt gas is burned by an unburnt gas burner of the heating, dry distilling and gasifying apparatus, and energy cost of the heating, dry distilling and gasifying apparatus can be reduced.

14. An infectious medical waste treatment system, comprising:
an infectious medical waste sterilizing and volume-reducing apparatus including a heating and compressing device for sterilizing, reducing in volume and detoxifying plastic infectious medical waste by heating and compressing the infectious medical waste;
a cake cutting device including a cutter for cutting a treated cake that is obtained by performing sterilization, volume-reduction and detoxification by heating and compression in the infectious medical waste sterilizing and volume-reducing apparatus, into an arbitrary size;
a cake shredding device including a shredder for shredding the treated cake cut by the cake cutting device into a fixed grain size;
a flake conveying device including a conveyor for conveying flakes obtained by shredding in the cake shredding device;
a flake temporary storage tank with a discharge mechanism for temporarily storing the flakes conveyed by the flake conveying device;
a sealed-type flake supplying device including a sealed-type supplier for supplying the flakes that are supplied from the flake temporary storage tank to a heating, dry distilling and gasifying apparatus;
the heating, dry distilling and gasifying apparatus is for heating and dry distilling the flakes that are supplied by the sealed-type flake supplying device to gasify the flakes;
a gas cooling and liquefying apparatus including a gas cooling and liquifier connected by piping to the heating, dry distilling and gasifying apparatus for cooling and liquefying gas that is generated in the heating, dry distilling and gasifying apparatus;
an exhaust gas treatment apparatus including a remover connected by piping to the gas cooling and liquefying apparatus for removing chloride, nitride and sulfide included in residual gas that is not liquefied by the gas cooling and liquefying apparatus;
an unburnt gas combustion apparatus connected by piping to the exhaust gas treatment apparatus for burning unburnt gas that is discharged from the exhaust gas treatment apparatus and removing odor; and
a system control device including a system controller for electrically interlocking and integrally controlling the infectious medical waste treatment apparatus, the cake cutting device, the cake shredding device, the flake conveying device, the flake temporary storage tank, the sealed-type flake supplying device, the heating, dry distilling and gasifying apparatus, the gas cooling and liquefying apparatus, the exhaust gas treatment apparatus, an unburnt gas burner and the unburnt gas combustion apparatus,
wherein the sealed-type flake supplying device is a vertical cylindrical pipe connecting the flake temporary storage tank and the heating, dry distilling and gasifying apparatus, with the vertical cylindrical pipe being provided with an upper-side opening and closing device and a lower-side opening and closing device capable of opening and closing a flow path of the vertical cylindrical pipe, and can intermittently supply the flakes to the heating, dry distilling and gasifying apparatus while a sealed state of the heating, dry distilling and gasifying apparatus is kept by repeating an operation of initially opening the upper-side opening and closing device to actuate the discharge mechanism of the flake temporary storage tank to supply the flakes for a fixed time period and stopping the discharge mechanism of the flake temporary storage tank, thereafter, closing the upper-side opening and closing device, subsequently opening the lower-side opening and closing device to cause the flakes to fall freely to the heating, dry distilling and gasifying apparatus, and thereafter closing the lower-side opening and closing device, and
wherein the gas cooling and liquefying apparatus is a multitubular heat exchanger, and is a gas cooling and liquefying apparatus with an automatic cleaning and removing function for scale on tubes that can remove the scale on all tubes at the same time by placing a movable plate in a position facing one tube plate of the multitubular heat exchanger, fastening rod-shaped members to a position facing tube opening portions on the movable plate, fastening scraper metal fittings to distal ends of the respective rod-shaped members, and reciprocating the scraper metal fittings from one tube opening portions to the other tube opening portions by a reciprocating device for the movable plate, and can clean and remove scale adhering to the scraper metal fittings by placing cleaning nozzles that are connected by piping to a detergent supplying pump on a base member in a position opposing the tube opening portions in the other tube opening portions of the multitubular heat exchanger, and actuating the detergent supplying pump to inject a detergent from the cleaning nozzles when the scraper metal fittings reach the other tube opening portions.

15. The infectious medical waste treatment system according to claim 14,
wherein the heating, dry distilling and gasifying apparatus comprises a heating and dry distilling oven for heating and dry distilling the flakes to gasify the flakes, a heating and dry distilling oven heating device including a heating furnace body opening and closing mechanism capable of opening and closing a part of a heating furnace body to heat the heating and dry distilling oven, an agitator and mixer for effectively heating the flakes in the heating and dry distilling oven by bringing the flakes into contact with an inner wall of the heating and dry distilling oven uniformly, and an automatic residue discharger for automatically discharging a residue in the heating and dry distilling oven by gradually opening an upper lid of the heating and dry distilling oven while tilting the heating and dry distilling oven and rotating the agitating and mixing device, and when the heating, dry distilling and gasifying apparatus heats, dry distills and gasifies the flakes continuously for a fixed time period, and thereafter, matters difficult to be gasified contained in the flakes accumulate as a residue in the heating and dry distilling oven, the heating and dry distilling oven heater is stopped to open a part of a heating furnace with the heating furnace body opening and closing mechanism, the heating and dry distilling oven is tilted to open the upper lid of the heating and dry distilling oven gradually, at the same time, the residue in the heating and dry distilling oven is automatically discharged while the agitating and mixing device is rotated, the heating and dry distilling oven is returned to a verticality after completion of the automatic discharge of the residue to close the upper lid of the heating and dry distilling oven, the heating furnace body opening and closing mechanism is closed to actuate the heating and dry distilling oven heating device, and a heating, dry distilling and gasifying operation of the flakes can be automatically performed repeatedly.

16. The infectious medical waste treatment system according to claim 14,
wherein the gas cooling and liquefying apparatus can fractionally distill low-boiling substances in a first-stage gas cooling and liquefying apparatus, and fractionally distill high-boiling substances in a second-stage gas cooling and liquefying apparatus, by the gas cooling and liquefying apparatus formed into two stages.

17. The infectious medical waste treatment system according to claim 14,
wherein the gas cooling and liquefying apparatus can fractionally distill low-boiling substances in a first-stage gas cooling and liquefying apparatus, and fractionally distill high-boiling substances in a second-stage gas cooling and liquefying apparatus, by the gas cooling and liquefying apparatus being formed into two stages, chlorides, nitrides and sulfides in residual gas that cannot be liquefied in the second-stage gas cooling and liquefying apparatus are removed by the exhaust gas treatment apparatus to make the residual gas unburnt gas, a part or all of the unburnt gas is burned by an unburnt gas burner of the heating, dry distilling and gasifying apparatus, and energy cost of the heating, dry distilling and gasifying apparatus can be reduced.

* * * * *